E. L. B. VON DIEZELSKI.
LOCKING DEVICE FOR AUTOMOBILE STEERING MECHANISMS.
APPLICATION FILED FEB. 18, 1920.
1,421,870.
Patented July 4, 1922.
2 SHEETS—SHEET 1.
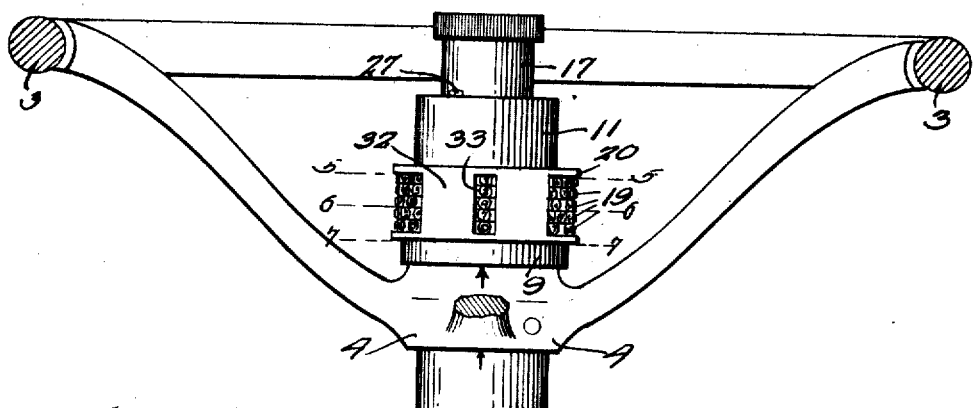
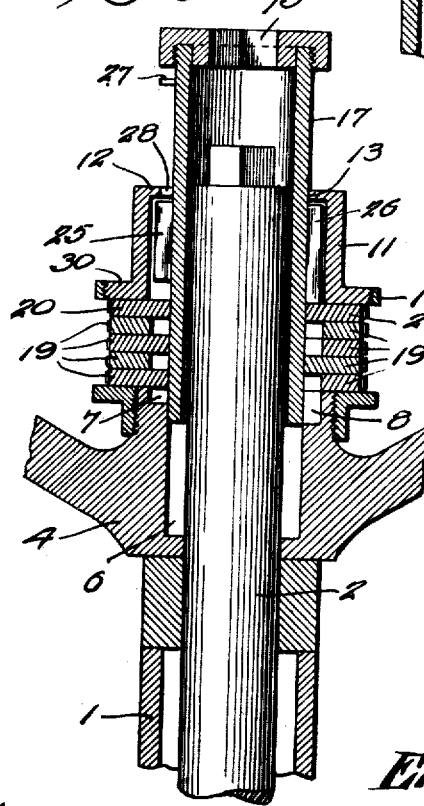
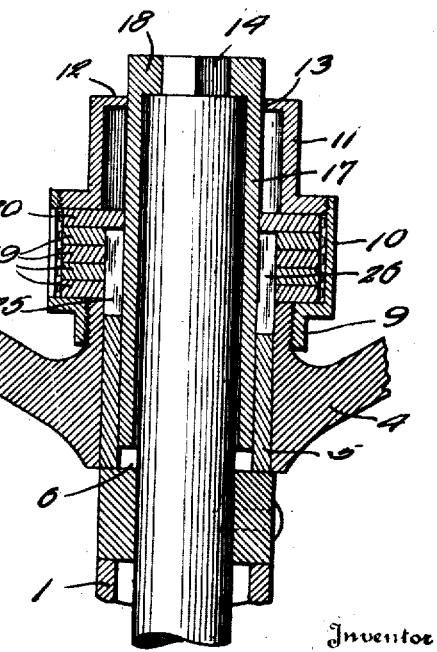
Inventor
Ernest L. B. Von Diezelski
By John E. Bragg
Attorney
Witness

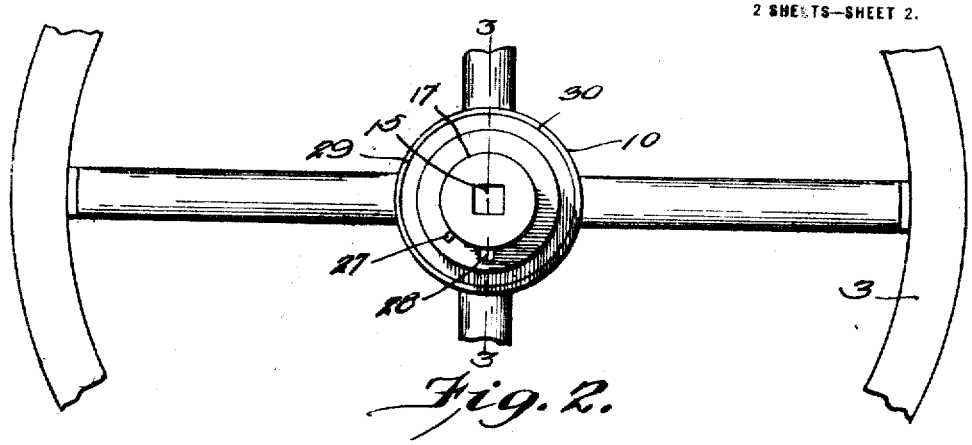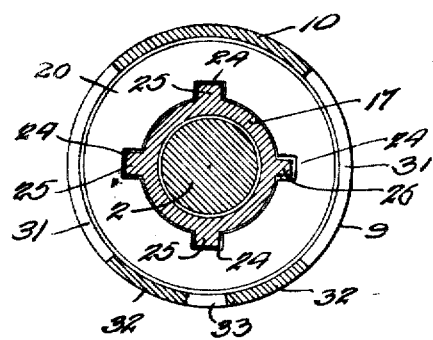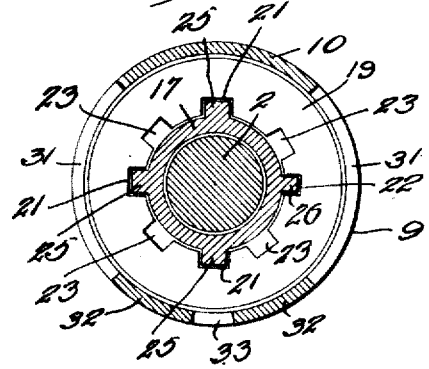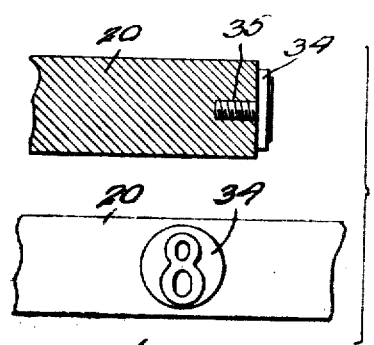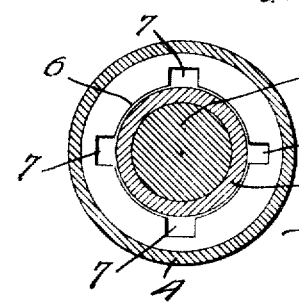

UNITED STATES PATENT OFFICE.

ERNEST L. B. VON DIEZELSKI, OF NEW YORK, N. Y.

LOCKING DEVICE FOR AUTOMOBILE STEERING MECHANISMS.

1,421,870.  Specification of Letters Patent.  Patented July 4, 1922.

Application filed February 18, 1920. Serial No. 359,649.

*To all whom it may concern:*

Be it known that I, ERNEST L. B. VON DIEZELSKI, a citizen of the United States, residing at New York city, borough of Bronx, in the county of New York and State of New York, have invented certain new and useful Improvements in Locking Devices for Automobile Steering Mechanisms, of which the following is a specification.

The invention relates to a locking means for use in connection with steering mechanisms of automobiles for the prevention of unauthorized operation thereof, as when the automobile is placed in storage in garages, or when left unattended in the temporary absence of the owner or authorized operator of the same.

The primary object of the invention is to provide for a comparatively simple and efficient locking means of the type mentioned, and one which may be readily applied to known types of steering mechanisms without serious modifications of present constructions of the same.

Another object of the invention is to provide a locking means for effectively performing the stated function, and one of a permutation type, in the use of which, the necessity of a separate actuating means for the manipulation thereof, such as a key or the like which is easily lost or otherwise mislaid, is obviated.

A further object of the invention is to provide a locking means of the character described, and one which is adapted to be mounted on the steering column of an automobile and manipulated for connecting and disconnecting the steering wheel to and from the steering rod or post, extending upward through the steering column, which connects the steering wheels of the automobile, and through the medium of which, the latter are manipulated for changing the direction of travel of the automobile.

With the foregoing and other objects in view, the invention resides in the certain features of construction and arrangement of parts as will be herein-after more fully described, set forth in the appended claims, and illustrated in the accompanying drawings, in which:—

Figure 1 is a front view, in elevation, of the upper end of the steering column of an automobile, with the hand steering wheel thereof in cross-section, and showing the preferred embodiment of the invention applied thereto, Figure 2 is a fragmentary top plan view of Figure 1 showing the locking mechanism in position on the steering column and the steering wheel thereof, Figure 3 is a vertical section on the line 3—3 of Figure 2 showing the position of the parts, when the steering wheel is disconnected from the steering post within the steering column.

Figure 4 is a view similar to that of Figure 3 showing the position of the parts, when the steering wheel is connected to the steering post.

Figure 5 is a horizontal section on the line 5—5 of Figure 1 showing the upper of the permutation discs in plan.

Figure 6 is a view similar to that of Figure 5, taken on the line 6—6 of Figure 1, and showing one of the lower discs in plan, Figure 7 is a similar view to that of Figures 5 and 6 taken on the line 7—7 of Figure 1, and showing the hub connection of the steering wheel, as it is engaged over the end of the steering column, and the lug engaging recesses therein, Figure 8 is an enlarged detail of one of the permutation discs showing the means for securing one of the several indicating members in position on the periphery thereof.

Referring to the drawings, and more particularly to Figures 1 to 7 thereof, the numeral 1 designates the fixed steering column of an automobile, and 2 the steering post, member or rod therein, the latter being preferably of the solid rod type as is usually employed in automobiles of relatively heavy construction, such as is found in delivery cars, motor trucks, and the like. Mounted on the end of the fixed column 1 is a hand steering wheel 3, having a hub portion 4 engaged over the end of the column, and free to rotate thereon in the usual manner and without effecting the steering post, means, to be herein-after fully described, being provided to alternately connect or disconnect the steering wheel to and from the steering post at the will of the authorized operator of the automobile for the purpose herein-before mentioned.

The hub 4 may be an integral part of the hand steering wheel 3, or the same may be fitted over and secured to a separate sleeve 5, Figure 4, surrounding the free end of the steering column. Opening through the upper face of the hub 4, or the sleeve 5, and concentric with the bore thereof, is a counter bore or annular channel 6, and opening through the upper face and extending radially of the wall of the counter bore or sleeve are a series of equidistantly spaced recesses or slots 7, preferably four (4) in number, and one of said recesses or slots being of slightly less width than that of the others and distinguished therefrom by the numeral 8, the purpose of which recesses or slots to be herein-after more fully set forth.

The outer periphery of the upper end of the hub 4, is threaded to receive thereon the complemental threaded portion 9 of a circular casing, the latter being formed with an intermediate portion 10, of greater diameter than that of the lower portion 9, and with an upper portion 11 of slightly less diameter than that of either the intermediate or lower portions, each portion of the casing being concentrically disposed with respect one to the other. The top end of the upper portion 11 of the casing is formed with an inturned flange 12, the inner edge or periphery of which forming the wall of a circular opening 13. The upper end of the steering post, member or rod 2 extends upward within the casing and is provided with a squared head or portion 14, the latter projecting into or slightly above the plane of the top wall of the opening 13 of the upper portion 11 of the casing, and is adapted to be alternately engaged by and disengaged from a correspondingly squared opening 15 of a flanged collar or cap-member 16 carried by or threaded on the upper end of a vertically sliding sleeve or locking member 17, which depends within the casing through the circular opening 13, and encloses the free end of the steering post or member 2 and has its lower end in sliding engagement with the counter-bore or annular channel 6 of the hub 4, or the sleeve 5, as the case may be. Instead of the flanged collar or cap-member 16 being threaded or otherwise secured on the upper end of the sleeve or locking member 17, the latter may be formed with an inturned flange 18, as in Figure 4, the edges of which forming the walls of the squared opening 15 adapted to engage with the squared head or portion 14 of the steering post or member 2.

Arranged within the intermediate portion 10 of the casing, and in superposed relation with respect one to the other, are a plurality of circular permutation discs 19 and 20, five of such discs being shown in the present instance, and each having a concentric opening engaged over the sleeve or locking member 17. The lower four of the discs, designated 19, are each provided with a set of slots or recesses formed therein and extending radially from the circular center opening and spaced equidistantly thereof, three of such slots or recesses, designated 21, are of equal area, while the fourth slot or recess 22 is of slightly less width as compared therewith. Interposed between each of the slots or recesses 21 and 22, are other slots or recesses 23, which may be termed "dummy" slots or recesses, and which may or may not be spaced equidistantly from the other set of slots or recesses 21 and 22. The upper disc 20 is also provided with a set of four slots or recesses 24, spaced correspondingly to register with the slots or recesses 21 and 22 of the discs 19, and the same are preferably all of an equal area approximating that of the slots or recesses 21 only. This disc 20 is not provided with "dummy" slots or recesses as are the discs 19, and it is to be noted of the "dummy" slots or recesses 23, of the discs 19, that the same are all preferably of equal area to that of the slots or recesses 21 therein, or they may be of an area corresponding to that of the narrow slots or recesses 22, of the discs 19 only. It is also to be noted that slots or recesses 7 and 8, of the hub 4, or sleeve 5, correspond to the slots or recesses 21 and 22, of the discs 19 and the slots or recesses 24, of the disc 20, and are adapted to be registered therewith in the operation of the device or mechanism.

The sliding sleeve or locking member 17 is provided with a plurality of equidistantly spaced and vertically elongated lugs, three of which, designated 25, are of an area in cross-section corresponding to the slots or recesses 21, of the discs 19, and all of the slots or recesses 24, of the disc 20, and one of an area to pass through the slots or recesses 22, of the discs 19, and the corresponding slot or recess 8, of the hub 4, or sleeve 5. One of the lugs, of the sleeve or locking member 17, is slightly longer, as indicated at 26, and may be properly termed the "dummy" lug, the purpose of which will be hereinafter more fully described. The top surfaces of the lugs 25 and 26 are all disposed in the same plane, and immediately above one of the same there is provided a pin 27, projecting radially from the sleeve or locking member 17, and which is adapted to pass through a slot 28, formed in the flange 12, of the opening 13, and, upon a slight turn imparted to the sleeve or locking member 17, when the same has been raised within the casing, rests upon the top face of the flange 12 to hold the locking member with the lugs 25 in the upper portion 11 of the casing and out of engagement with the slots or recesses of the discs. In this position, the opening 15, of the sleeve or locking member 17, is out of engagement with the head 14, and consequently, the hand or steering wheel 3 is disconnected from the steering mechanism.

To properly assemble the parts within the casing, the upper portion 11 thereof is removable therefrom at its threaded connection with the intermediate portion 10, as indicated at 29, an annular flanged portion 30 being formed at the lower end of the upper portion 11 and extending radially therefrom and engaging within the upper end of the intermediate portion 10. The vertical wall of the intermediate portion 10, of the casing, is provided with diametrically opposed cutaway portions to provide relatively wide openings 31 through which the fingers are to be inserted for the manipulation of the permutation discs 19 and 20, when the latter are positioned within the same, and the front wall portion 32, between the openings 31, is provided with a vertically elongated sight opening 33. The periphery of each of the discs 19 and 20 are provided with suitable indicating points, numbered 1 to 9 and a 0, and which are adapted to register with the sight opening in any suitable or desired combination. To enable the operator to change the combination throughout a wide range, the indicating points are in the form of numbered discs 34, each having a threaded shank 35 fitting into suitable similarly threaded openings in the peripheries of the discs, and are consequently interchangeable one with the other. (Figure 8 of the drawing).

In the operation of the locking mechanism thus provided and assembled, a predetermined combination of the numbers on the several discs 19 and 20 having been selected and properly arranged thereon, as for instance 32470 reading downward, the discs are rotated, by the fingers being inserted through the openings 31, until the numbers selected are brought into registry and alignment with the sight opening 33, as shown in Figure 1, so that the slots or recesses 21 and 22 are brought into proper alignment with complemental slots or recesses 24, of the disc 20, and with the complemental slots or recesses 7 and 8, of the hub 4 or the sleeve 5. The upper or projected end of the sleeve or locking member 17 is now grasped by the fingers and turned to bring the pin 27 into alignment with the slot 28, and then lowered into the casing, the pin 27 passing downward through the slot 28, and the lugs 25, now in alignment with the properly registering slots or recesses of the several discs, into engagement with the latter and with the recesses 7 and 8 of the hub 4, or the sleeve 5. In this position, the opening 15, of the locking member 17, engages over the squared head of the steering post or rod 2, and consequently, the hand or steering wheel 3 is connected to the latter for performing the usual steering operation. In the lower position of the sleeve or locking rod 17, the top surfaces of the lugs 25 are disposed in a plane immediately below the upper disc 20, so that the latter may be removed from the combination, or rotated to act as a locking means to prevent the locking member 17 being accidently jolted or removed from engaged position.

In the reverse operation of the locking mechanism, that of disconnecting the steering wheel 3 from the steering post 2 for rendering the steering mechanism inoperative during the absence of the owner or other authorized operator of the automobile, the top disc is returned to the proper combination setting, as before stated, and the sliding sleeve or locking member 17 is lifted from engagement with the several recesses of the discs 19 and 20 and of the hub 4, or sleeve 5, the pin 27 passed through the slot 28, and by a turn of the sleeve or locking member 17, is allowed to come to rest on the top surface of the flange 12. The lugs 25 are now within the upper portion 11, of the casing, so that the discs 19 and 20 are free to be rotated to break the combination, and the hand or steering wheel 3 is disconnected from the steering mechanism.

In the event of an illegal attempt to restore the operative connection between the steering wheel and the steering post or member 2, and the sliding sleeve or locking member 17 is lowered into the casing, the longer of the lugs 25 will, upon rotation of the locking member 17 or the discs 19 and 20, or both, pass through the recesses 24 of the upper disc 20 and engage in one of the comparatively large number of main and dummy recesses of the lower disc or discs, but it is improbable that it would engage in its complemental recess for the further lowering of the locking member, and should such be the case the lower discs, and their "dummy" recesses in addition to the main recesses, would render it extremely difficult for the accomplishment of the final lowering of the locking member into operative position.

From the foregoing description of the construction and operation of the invention, it will be readily obvious that the same embodies a simple and effective means for rendering an automobile inoperative during the absence of the owner or authorized operator thereof, such as will prevent the illegal use of the automobile, when the same is placed in storage in garages, or the theft thereof, when the same is left unattended in its daily use, the locking mechanism being capable of quick manipulation for either the locking or unlocking operations, such as will not involve much of the time of the owner or operator, especially since the usual key or other similar separate lock actuating device is dispensed with.

It is also to be understood that various modifications, and changes in specific construction and arrangement, or number of parts may be resorted to without departing from the spirit and scope of the invention.

Having thus fully described my invention, what I claim, is:—

1. In a device of the class described, an open ended steering column, a steering wheel journalled on the open end of said steering column, a circular casing carried on the upper face of the central portion of said steering wheel, a steering post extending upward within said steering column and having its free end projecting into the plane of the upper end of said casing, locking members within said casing, and a locking sleeve surrounding the free end of said steering post and adapted for vertical movement within said casing and with respect to said steering element and to said locking members.

2. In a device of the class described, an open ended steering column, a steering wheel journalled on the open end of said steering column, a cylindrical casing carried on the upper face of the central portion of said steering wheel, a steering post extending upward within said steering column and having its free end projecting into the plane of the upper end of said casing, locking members within said casing, and a locking sleeve fitted over the free end of said steering post and depending within said casing for vertical movement with respect to said steering post and to said locking members.

3. In a device of the class described, an open ended steering column, a hub member journalled on the open end of said steering column, a steering wheel carried by said hub member, a cylindrical casing supported on the upper face of the central portion of said steering wheel, a solid steering post extending upward within said steering column and having its free end projecting into the plane of the upper end of said casing, locking members within said casing and surrounding said steering post, and a locking sleeve fitted over the free end of said steering post and depending within said casing for vertical movement therein and with respect to the said free end of said steering post and to said locking members.

4. In a device of the class described, an open ended steering column, a hub member journalled on the open end of said steering column, a steering wheel carried by said hub member, a cylindrical casing supported on the upper face of the central portion of said steering wheel, a solid steering post extending upward within said steering column and having its free end projecting into the plane of the upper end of said casing, permutation locking members within said casing and surrounding said steering post, and a locking sleeve fitted over the free end of said steering post and depending within said casing for vertical movement therein with respect to the said free end of said steering post and to said permutation locking members.

5. In a device of the class described, an open ended steering column, a hub member journalled on the open end of said steering column, a steering wheel carried by said hub member, a cylindrical casing supported on the upper face of the central portion of said steering wheel, a solid steering post extending upward within said steering column and having its free end projecting into the plane of the upper end of said casing, a plurality of circular permutation discs arranged in superposed relation within said casing and surrounding said steering post, and a locking sleeve fitted over the free end of said steering post and depending within said casing for vertical movement therein with respect to the said free end of said steering post and to said permutation discs.

6. In a device of the class described, an open ended steering column, a steering wheel journalled on the open end of said steering column, a steering post extending upward within said steering column and having its upper end projecting above the open end of the latter, a cylindrical casing carried on the upper face of the central portion of said steering wheel and enclosing the open end of said steering column and the projecting end of said steering post, locking members within said casing and having central aligning openings therein, a locking element movable vertically within said casing and with respect to the upper end of said steering post and to said locking members, said locking element having a squared recess adapted to engage with and be disengaged from a squared head at the free end of said steering post correspondingly with the movements of said locking element, and means for retaining said locking element in raised and inoperative position.

7. In a device of the class described, an open ended steering column, a steering wheel journalled on the open end of said steering column, a steering post extending upward within said steering column and having its upper end projecting above the plane of the open end of the latter, a cylindrical casing removably supported on the upper face of the central portion of said steering wheel and enclosing the open end of said steering column, a plurality of circular permutation discs arranged in superposed relation within said casing and having central aligning openings therein, recesses formed in said permutation discs and adapted to be moved into and out of registry, a locking sleeve depending within said casing and passing through the aligned openings of said permutation discs, lugs carried on said locking sleeve and adapted for engagement with certain of the recesses of said permutation discs when operative, and means for retaining said locking sleeve in raised and inoperative position.

8. In a device of the class described, an open ended steering column, a steering wheel journalled on the open end of said steering column, a cylindrical casing removably secured on the upper face of the central portion of said steering wheel, a solid steering post extending upward within said steering column and having its free end projecting through said casing, permutation discs within said casing and surrounding said steering post, said permutation discs being formed with a plurality of spaced recesses, a locking element fitted over the free end of said steering post and having a recess in its upper end adapted for engagement with a squared head formed at the said free end of said steering post, said locking element depending within said casing and having vertical movement therein between the steering post and said permutation discs, lugs carried on said locking element and adapted for engagement with certain of said recesses of said permutation discs when operative, and means for retaining said locking element in raised and inoperative position.

9. In a device of the class described, a fixed open ended steering column, a steering wheel journalled on the open end of said steering column, a cylindrical casing removably secured on the upper face of the central portion of said steering wheel, a solid steering post extending upward within said steering column and said casing, the free end of said steering post projecting to a point flush with the top of said casing and having a squared head projecting above the plane thereof, permutation discs within said casing and surrounding said steering post, said permutation discs being formed with a plurality of spaced recesses, the upper of said permutation discs having a less number of recesses than the lower of said discs, a locking element depending within said casing and surrounding said steering post, said locking element having its upper end projecting above the top of said casing and having a squared recess formed therein adapted to be engaged with and disengaged from the squared head formed on said steering post, said locking element having vertical movement within said casing between said steering post and said permutation discs, lugs formed with said locking element and adapted for engagement with certain of said recesses of said permutation discs when operative, said lugs corresponding in number to the number of recesses of the uppermost of said permutation discs, and means for retaining said locking element in raised or inoperative position.

In testimony whereof I affix my signature.

ERNEST L. B. VON DIEZELSKI.